P. E. McNEIL.
METHOD OF AND APPARATUS FOR DETECTING PITTING AND THE LIKE IN TUBES AND PIPES.
APPLICATION FILED MAY 3, 1920.
1,363,258. Patented Dec. 28, 1920.
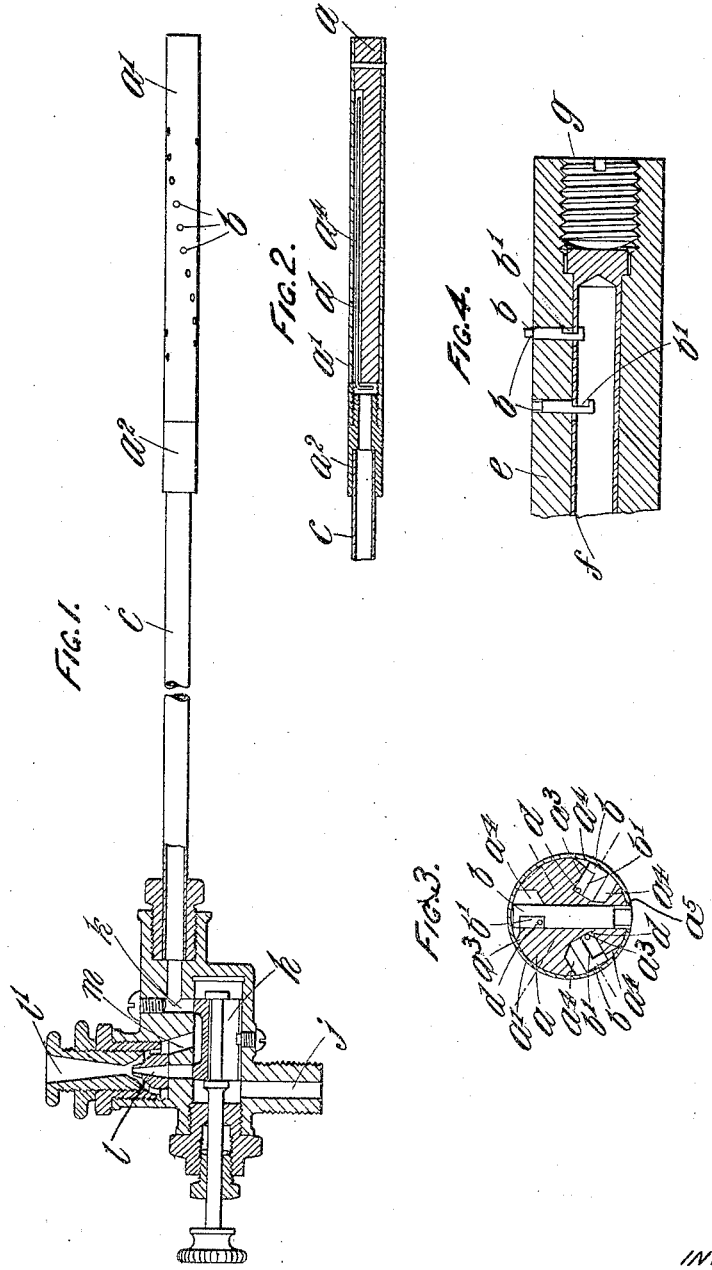
INVENTOR
Percival E. McNeil
by
Wm. F. Babcock & Son
Attorneys

UNITED STATES PATENT OFFICE.

PERCIVAL E. McNEIL, OF ESSENDON, VICTORIA, AUSTRALIA.

METHOD OF AND APPARATUS FOR DETECTING PITTING AND THE LIKE IN TUBES AND PIPES.

1,363,258. Specification of Letters Patent. Patented Dec. 28, 1920.

Application filed May 3, 1920. Serial No. 378,712.

*To all whom it may concern:*

Be it known that I, PERCIVAL EDWIN McNEIL, a subject of the King of Great Britain, residing at 41 Ardock street, Essendon, State of Victoria, Australia, have invented certain new and useful Improvements in Methods of and Apparatus for Detecting Pitting and the like in Tubes and Pipes, of which the following is a specification.

This invention relates to a method of and apparatus for detecting pitting, corrosion and other irregularities of the interior surfaces of tubes and pipes. The invention is intended primarily for use in connection with the detection of pitting in condenser tubes, and it is to this application of the invention that the following description will be more particularly directed. Usually, when condenser trouble begins to manifest itself, it is found to be due to a comparatively small number of tubes being corroded in small spots only. Some of the methods heretofore adopted for detecting the pitting are as follows: In one method, a percentage of the tubes is removed and cut open, and from an examination of their condition some idea may be obtained as to the probable condition and fitness for work of the remaining tubes. It will be obvious that such a method leaves a great deal to chance. Another method is to place a strong light at one end of each tube and sight it from the other end, but this method is unsatisfactory inasmuch as it does not enable small pit holes to be discovered unless they are very near the ends of the tube. A still further method is to subject the tubes to a high pressure test, but under such a test only those tubes give out in which the individual pit holes or other defects cover a considerable area, or where the pit holes, if small, extend almost completely through the wall of the tube. In addition to the above mentioned defects of these methods, there are various other defects as will be readily appreciated by those skilled in the art to which this invention appertains. Now, the chief object of this invention is to enable the whole of the interior surface of the tubes to be explored or searched for pitting and the like with certainty and rapidity.

According to this invention, a number of feelers or pins are employed within the tube or pipe, in such a manner that the resistance caused by their movement indicates the degree of pitting or the like present in the tube or pipe, as the extent of protrusion of a feeler will depend on the depth of the pit which it enters and the strain on the feeler will correspondingly vary as the head moves forward, said strain being transmitted by such feeler to the head and tending to draw obliquely laterally and backward that side of said head which carries said feeler. The same is true if several feelers enter a pit or encounter other resistance. This strain is transmitted by the head and the tool generally to the hand of the operator holding it as an impression of resistance varying in extent, amount and location with the breadth, depth and position of the pitting. In carrying out the test it is preferred to maintain the feelers in contact with the said surface by means of compressed air or other suitable fluid under pressure. According to a convenient manner of carrying out this invention, the feelers, in the form of round pins, are mounted in a head or carrier which is of slightly smaller diameter than the tube and in which the feelers are allowed a certain longitudinal or endwise movement. The feelers are so distributed in the head that, while the head is being passed along the interior of the tube without being rotated they feel or search over the whole surface of the tube so that one feeler at least will drop into or enter any pit hole or depression of any considerable size that there may be in the tube. The number and diameter of the outer ends of the pins depend on the smallest diameter of pit hole that it is desired to locate in the particular piece of work in hand.

In order that this invention may be more clearly understood and readily carried into effect, I will proceed to describe the same with reference to the accompanying drawings, wherein—

Figure 1 is an elevation partly in section of detecting apparatus constructed in accordance with this invention;

Fig. 2 is a longitudinal section of the head of same.

Fig. 3 is a transverse section of said head.

Fig. 4 is a longitudinal section of a portion of a modified form of head constructed according to this invention.

Referring to Figs. 1, 2 and 3 of the drawings, the head consists of a core *a* surrounded by a casing $a'$. The feelers or pins are shown at $b$ and they are mounted in equidistant helical rows and work in holes in the casing $a'$ of the head. In the example illustrated, three such rows are shown, and this number will be found to be usually sufficient, but the number of rows can be varied with the variation in the diameter of the head. The casing $a'$ is screwed onto a tubular connection $a^2$ whereby it can be joined up to a flexible or other pipe $c$ which is connected with the pressure source as will be hereinafter explained.

The core $a$ is provided with diametrical holes $A^3$ (Fig. 3) arranged in helical rows in which the feelers are mounted, and each row of holes communicates, at one end, with a groove $a^4$ which follows the direction of its own line of holes and is, therefore, also of helical formation. Each such groove opens out on opposite sides of its row of holes, the depth of the groove on one side of the feelers being greater than it is on the other side, as clearly shown in Fig. 3. The casing $a'$ closes in the grooves $a^4$, but is perforated at its opposite side at $a^5$ in order to allow the noses or outer ends of the feelers to protrude.

As shown in Figs. 2 and 3, a wire $d$ is passed along each of the grooves when the feelers are in position in the head and, engaging notches $b'$ (Fig. 3) formed in the feelers, limits their outward travel, while their inward travel is limited by reason of their inner ends engaging the casing $a'$. By withdrawing the wires the feelers can be removed.

In an alternative method, illustrated in Fig. 4, of mounting the feelers in heads of larger diameter, the feelers are arranged in helical rows in an outer casing $e$ which is much thicker than the casing $a'$. Within the casing $e$ is a liner $f$ which communicates with the pressure source and is provided with helical rows of holes arranged to register with the helical rows of holes in the casing $e$. In assembling the feelers, the liner $f$ is advanced in its casing for a distance nearly equal to the depth of the notches $b'$ in the feelers so that it partially covers the inner ends of the holes in the casing. In this position it limits both the outward and inward travel of the feelers owing to its overlapping portions being in a position to engage both ends of the notches in the feelers. The liner $f$ may be secured in position by a plug $g$ screwed into the casing. In order to remove the pins it is merely necessary to slacken the plug and withdraw the liner through a distance sufficient to bring its holes into line with the holes in the casing, whereupon the feelers can be removed.

Intermediate the head and the pressure source is arranged suitable mechanism for controlling the supply of compressed air or other fluid employed for the purpose of forcing the feelers out against the tube to be tested and also enabling them to withdraw into the head. Said mechanism is preferably constructed as shown at the left hand end of Fig. 1, in which $h$ is a slide valve which, when moved to the extreme left hand end of its travel, opens a passage from the compressed air inlet $j$, through a port $k$ into the pipe $c$, whereby the pressure is transmitted to the feelers and forces them outward. When moved to its extreme right hand position, the valve $h$ opens the compressed air inlet $j$ to the nozzle $l$ of an ejector $l'$ and at the same time opens the port $k$ to an outlet port $m$ communicating with the ejector whereby a passage is opened from the head through the ejector to the atmosphere. In this way, air is exhausted from the head and its connecting pipe and consequently the external air pressure forces the feelers back into the head.

In using the apparatus, the head is first exhausted so as to keep the feelers drawn back into itself whereby its introduction into the tube to be explored is facilitated. The head, having been inserted into the tube, is then opened to the pressure which thereupon forces the feelers outward against the walls of the tube, and it is then pushed through the tube. If the tube surface is smooth, the head will move easily. The presence of pit holes or depressions, however, will be at once detected by the resistance offered to the movement of the head, and their depth, extent, etc., will be indicated by the behavior of the head, which will undergo strain, tending to move it obliquely rearward and laterally at the point where the feelers entering a pit will meet with resistance, and the strain will be transmitted as stated to the hand of the operator holding the tool, as an impression of resistance varying with the breadth, depth and location of the pitting.

I claim:—

1. Apparatus for searching the interior surface of a tubular body for pitting and other irregularities consisting of a head adapted to be inserted into said body and provided with feelers adapted to be moved outward into contact with the interior surface thereof and means for applying fluid pressure to thrust said feelers outwardly and for withdrawing said pressure when desired.

2. Apparatus for searching the interior surface of a tube or pipe for pitting or other irregularities comprising a head adapted to be inserted in said tube or pipe and provided with outwardly movable pins to act as feelers, fluid-pressure being provided and arranged to force said pins into contact with the interior surface of said tube or pipe.

3. Apparatus for searching the interior surface of a tube or pipe for pitting or other irregularity comprising a head, feelers or pins carried by said head, and means for projecting said feelers or pins by fluid pressure and means for withdrawing said feelers or pins from contact with the pipe or tube by a reduction of such fluid pressure.

4. Apparatus for searching the interior surface of a tube for pitting or other irregularity, comprising a head, feelers or pins carried by said head and movable outward therefrom, a tube connected with said head for conveying fluid pressure thereto and valve and ejector mechanism for controlling such fluid pressure.

5. Apparatus for searching the interior surface of a tube for pitting or other irregularity, comprising a head, feelers carried by said head, movable outward therefrom, and provided with recesses, means for moving said feelers outward, and wires located in said recesses for limiting the outward movement of said feelers, said recesses being constructed to provide for such limiting engagement of the wires with the feelers.

6. Apparatus for searching the interior surface of a tube or pipe for pitting or other irregularity, comprising a head, movable feelers provided with recesses and carried by said head, means for moving outward said feelers, wires located in said recesses, said wires being removable so as to free said feelers, the said recesses being constructed to provide for the engagement of said wires with the material of said feelers, normally limiting the outward movement of the latter.

7. Apparatus for searching the interior surface of a tube or pipe for pitting or other irregularity, comprising a cylindrical head, movable pins arranged helically in said head, means for retaining said pins in said head, means for conveying fluid pressure to and from said pins to control their projection and withdrawal, and means for controlling said fluid pressure.

8. Apparatus for searching an interior surface of a tubular body for pitting or other irregularity comprising a head, outwardly movable feelers mounted therein and arranged in line, means for moving outward said feelers and a wire following such line of feelers to limit their protrusion, said feelers being notched to engage such wire, permitting such limitation.

In testimony whereof I have signed my name to this specification in the presence of two subscribing witnesses.

PERCIVAL E. McNEIL.

Witnesses:
R. M. NEWTON,
K. SHEEHY.